(12) United States Patent
Widrig et al.

(10) Patent No.: US 12,098,786 B2
(45) Date of Patent: Sep. 24, 2024

(54) EAR CLAMP WITH CUPLOCK HOOK-SYSTEM

(71) Applicant: Oetiker Schweiz AG, Horgen (CH)

(72) Inventors: Markus Widrig, Horgen (CH); Maxime Bösiger, Horgen (CH); Tim Werner, Horgen (CH); Melanie Müller, Horgen (CH)

(73) Assignee: Oetiker Schweiz AG, Horgen (CH)

( * ) Notice: Subject to any disclaimer, the term of this patent is extended or adjusted under 35 U.S.C. 154(b) by 29 days.

(21) Appl. No.: 17/862,627

(22) Filed: Jul. 12, 2022

(65) Prior Publication Data

US 2023/0313924 A1     Oct. 5, 2023

(30) Foreign Application Priority Data

Apr. 4, 2022 (DE) .................... 10 2022 108 052.8

(51) Int. Cl.
| | |
|---|---|
| *F16L 21/06* | (2006.01) |
| *F16B 2/08* | (2006.01) |
| *F16L 33/02* | (2006.01) |
| *F16L 33/025* | (2006.01) |

(52) U.S. Cl.
CPC ............... *F16L 21/06* (2013.01); *F16L 33/02* (2013.01); *F16L 33/025* (2013.01); *F16B 2/08* (2013.01)

(58) Field of Classification Search
CPC ....... F16L 33/02; F16L 33/035; F16L 33/025; F16L 33/12; F16B 2/08; Y10T 24/1457
See application file for complete search history.

(56) References Cited

U.S. PATENT DOCUMENTS

| | | | | |
|---|---|---|---|---|
| 3,789,463 | A | * | 2/1974 | Oetiker ................. F16L 33/025 |
| 4,430,775 | A | * | 2/1984 | Arthur ...................... F16B 2/08 |
| 5,105,509 | A | * | 4/1992 | Lilley ................... F16L 33/035 |
| 5,138,746 | A | * | 8/1992 | Ojima ................... F16L 33/035 |
| 10,066,772 | B2 | * | 9/2018 | Seelos ................. F16L 33/025 |
| 2003/0014846 | A1 | * | 1/2003 | Kim ....................... F16L 33/025 |
| 2014/0259547 | A1 | * | 9/2014 | Miessmer ............. F16L 33/035 |

FOREIGN PATENT DOCUMENTS

| | | | | | |
|---|---|---|---|---|---|
| DE | | 3509391 A | * | 1/1986 | |
| WO | | 2015022024 A1 | | 2/2015 | |
| WO | WO-2020169222 A1 | * | 8/2020 | ............ F16L 33/025 |
| WO | | 2021104918 A1 | | 6/2021 | |

OTHER PUBLICATIONS

DE-3509391-A—Machine Translation—English (Year: 1986).*
WO-2020169222-A1—Machine Translation—English (Year: 2020).*

* cited by examiner

*Primary Examiner* — William S. Choi
(74) *Attorney, Agent, or Firm* — David L. Nocilly; Bond Schoeneck & King PLLC

(57) ABSTRACT

An ear clamp (10) comprising a clamping band (12) and tightening structure (14), wherein the clamping band (12) has an outer clamping band end (12a) and an inner clamping band end (12b), wherein the inner clamping band end (12b) includes a first hook (16) which, in the closed condition, passes through an opening (18) in the outer clamping band end (12a). In a top view of the band, the openings (18) are slit-shaped.

9 Claims, 5 Drawing Sheets

EAR CLAMP WITH CUPLOCK HOOK-SYSTEM

CROSS-REFERENCE TO RELATED APPLICATIONS

The present application claims priority to German Patent Application DE 10 2022 108 052.8, filed on Apr. 4, 2022.

BACKGROUND OF THE INVENTION

(1) Field of the Invention

The invention relates to an ear clamp for connecting a tube, in particular a tube made of PEX (polyethylene) materials often used in the plumbing trade, to an object to be inserted into the tube, e.g. a tube fitting.

(2) Description of Related Art

The document WO 2015022024 A1 discloses a generic open ear clamp comprising a tightening structure in the form of a so-called Oetiker ear. The clamp comprises a hook which, in the closed condition, passes through the window in the outer clamping band end. The window is punched out of the band material.

The document WO 2021104918 A1 discloses a band clamp with a plurality of hooks and windows which can be engaged with each other to close the clamp.

Existing hook designs have big openings in the band material where material is punched out and material waste is produced. Depending on the design, the hook by itself, a rivet lock and a securing hook may engage with windows having have these big openings. The openings extend both in longitudinal and in the width direction of the band such that the total amount of band material is reduced in the longitudinal sections of the band having windows. As a consequence, the tensioning force which is applied to the clamp is concentrated in the lateral webs on the sides of each window, which entails increased band elongation in the area of the windows/openings because the cross section in this area is reduced. This results in a lower transmitted force and a performance decrease.

BRIEF SUMMARY OF THE INVENTION

The invention seeks to improve the performance of a clamp by modifying the closing elements for closing the clamp, specifically by improving the structure of the hooks and/or of the windows engaging with each other.

The problem is solved by a device having the features of claim 1. Advantageous embodiments of the invention are defined by the dependent claims.

The invention relates to an ear clamp comprising a clamping band and tightening structure, wherein the clamping band comprises an outer clamping band end and an inner clamping band end, wherein the inner clamping band end includes a first hook which, in the closed condition, passes through an opening in the outer clamping band end.

It is proposed that, in a top view of the band, the openings are slit-shaped. In the context of the invention, slit-shaped means longer than wide. To quantify the aspect ratio of a slit-shape, it is proposed that the length of the openings in a transverse direction of the clamping band is at least five times larger than the width of the openings in a longitudinal direction of the clamping band. The slit-shape prevents the production of material amounts of waste.

The clamping band has an inner side oriented toward the hose or tube and/or to the inside of the ring formed by the clamp in the closed condition, and an outer side oriented radially outside. In the closed condition, the inner side of the outer clamping band end contacts the outer side of the inner clamping band end, the inner side of the inner band end contacts the hose or tube and the outer side of the outer band end is freely accessible on the outside.

The clamping band has a longitudinal direction and a transverse direction, the latter being the width direction of the band. The thickness direction of the clamping band is perpendicular to both of these directions. A top view of the band is a view from the outer side of the band in the thickness direction.

The low width of a slit-shaped opening implies that the length of the band section weakened by the opening is small, resulting in a small band elongation and, as a consequence, improved performance.

In a preferred embodiment of the invention, the material of the band is domed up on a side of the opening facing the tightening structure to form a cup configured to receive the first hook. The cup facilitates engaging the hook with the opening even if the opening is line-shaped in the top view by generating an opening in a side wall of the first dome.

In a preferred embodiment of the invention, a width of the cup is larger than the width of the opening and decreases toward the opening. As explained later in more detail, the side walls of the cup may help guiding the first hook into the opening and further generate a wedge effect taking off load from the hook.

It is further proposed that the first hook is formed on the tip end of a wedge-shaped protrusion configured to wedge with inner side faces of the dome. The wedging- and guiding effect may be made independent from the hook.

In a further preferred embodiment of the invention, the material of the band is bent downward on a side of the opening facing away from the tightening structure to form a lower hook configured to wedge with the upper hook. The wedging of the lower hook and the upper hook holds the band down. This results in the hook being able to transfer more force from the upper to the lower band.

The inventors propose that the opening is arc-shaped with a convex side facing toward the tightening structure. The convex side can therefore be easily bent down to form the lower hook as explained above.

In a preferred embodiment of the invention, the opening is formed as a cut without punching material out of the band, e.g. by lancing.

The inventors further propose that the structures around the opening and/or the first hook are formed by a material deformation process resulting in cold hardening of the material. This lends additional stability to the band, reduces unintended deformations and band elongation.

According to a further aspect of the invention, reinforcing dimples are formed in the proximity of the opening. This may help improving the force distribution and force transmission in the regions concerned.

Preferably, the reinforcing dimples are embossed only on the top side of the clamping band, the bottom side of the clamping band being flat at the position of the reinforcing dimples.

Further features and advantages will be apparent from the following description of the embodiments and figures. The entire description, claims and figures disclose features of the invention in specific embodiments and combinations. The person skilled in the art will also consider the features individually and combine them into further combinations or sub-combinations to adapt the invention, as defined in the claims, to his needs or to specific fields of application.

BRIEF DESCRIPTION OF THE SEVERAL VIEWS OF THE DRAWING(S)

Thereby showing:

DETAILED DESCRIPTION OF THE INVENTION

Figure 1:
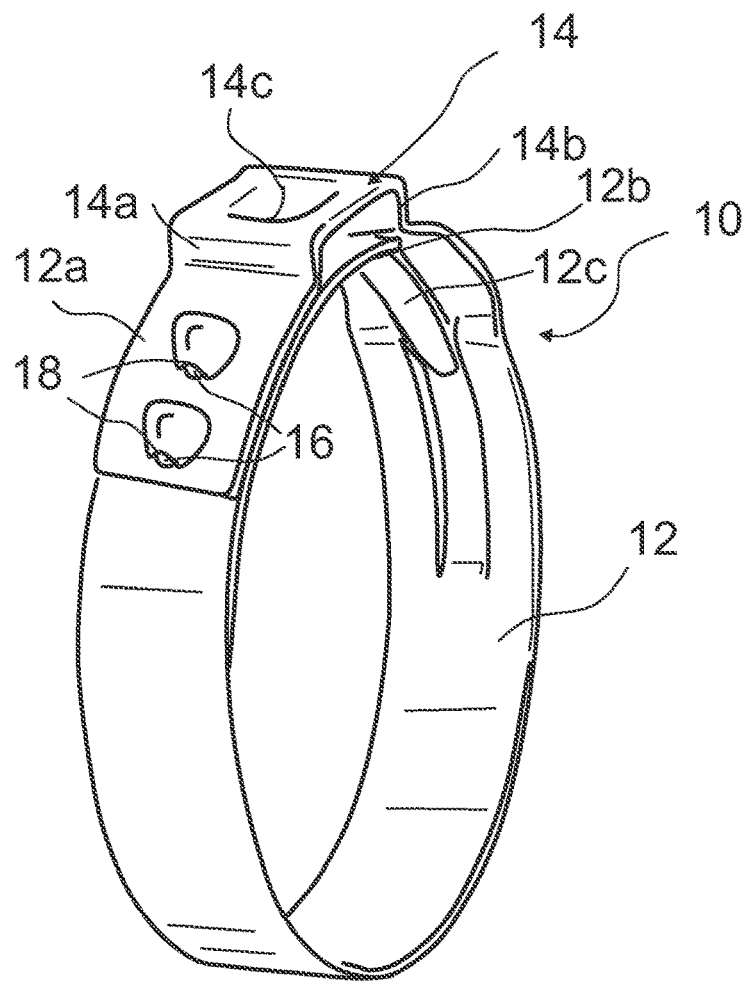
FIG. 1 is an ear clamp according to the invention.

FIG. 1 shows an ear clamp 10 according to the invention.

The ear clamp 10 illustrated in FIG. 1 comprises a clamping band 12 and a tightening structure 14, wherein the clamping band 12 comprises an outer clamping band end 12a and an inner clamping band end 12b.

The tightening structure 14 is a so-called "Oetiker-ear", with two radially outward extending legs 14a, 14b and a web 14c interconnecting the outer ends of the legs 14a, 14b. A depression is stamped in the web 14c of the ear to prevent buckling. The inner clamping band end 12b is extended by a tongue 12c guided by two lateral walls of a recess created by press-forming the clamping band 12 and inward projecting steps. In alternative embodiments, the tongue may be guided by lateral straps created by longitudinal cuts.

In use, the ear clamp 10 surrounds a tube at a position where an object (not shown), such as fitting, is inserted into the tube.

Figure 2:
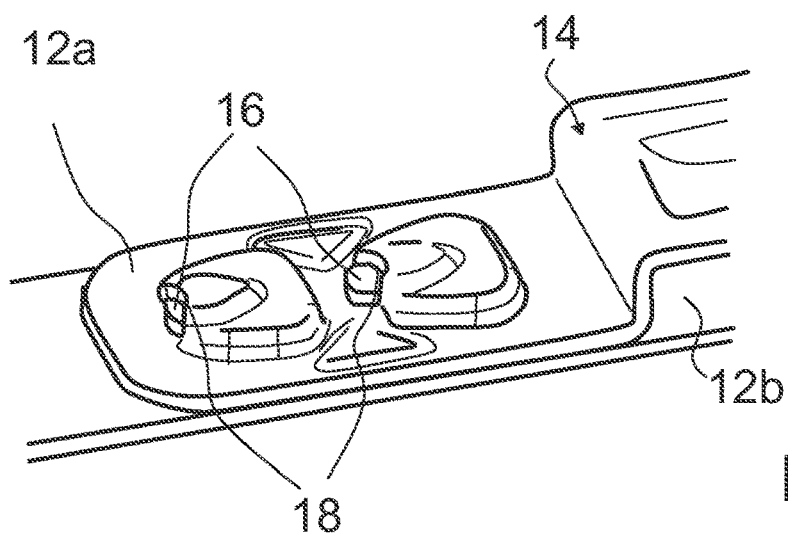
FIG. 2 is a detailed view of closing structures of the ear clamp according to FIG. 1.

FIG. 2 is a detailed view of closing structures of the ear clamp according to FIG. 1. The inner clamping band end 12b includes two first hooks 16 which, in the closed condition, pass through corresponding openings 18 in the outer clamping band end 12a, respectively. The hooks 16 and the openings 18 are also referred to as a closing structure of the ear clamp 10.

Figure 3:
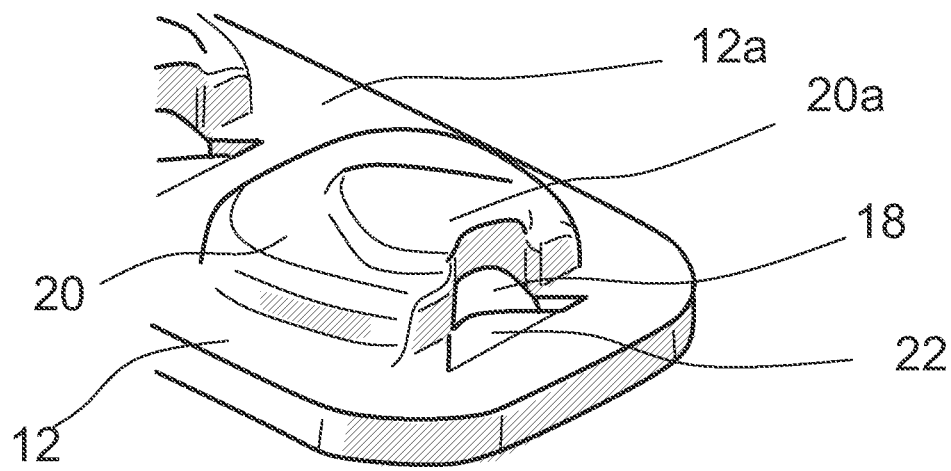
FIG. 3 is a detail view of a cup structure of an outer band end of the ear clamp according to FIG. 1.
Figure 4:
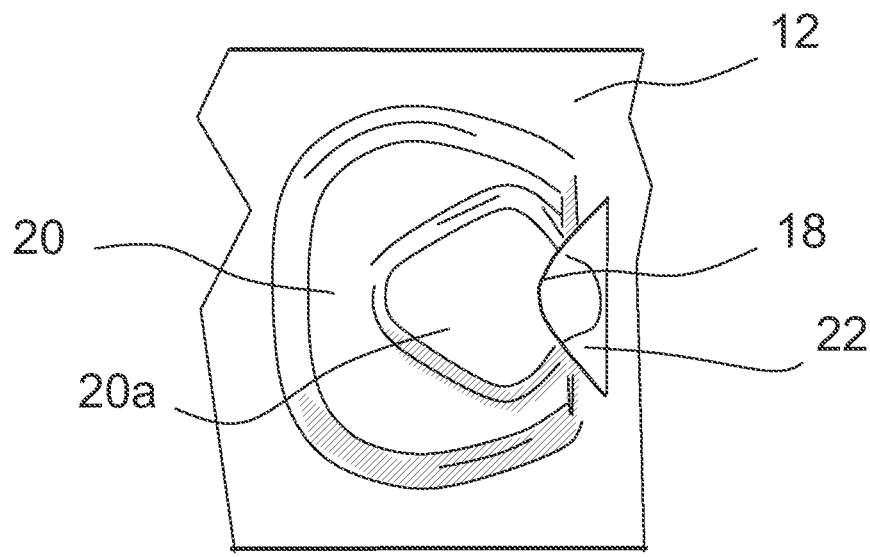
FIG. 4 is a top view of the cup structure of FIG. 3.

FIG. 3 is a detail view of a cup structure of an outer clamping band end 12a of the ear clamp 10 according to FIG. 1 and FIG. 4 is a top view of the cup structure of FIG. 3. The openings 18 are slit-shaped in the top view of the clamping band 12 (FIG. 4) and are formed as a cuts without punching material out of the clamping band 12, also referred to as lancing. The clamping band 12 further includes embossed structures and the cuts may be formed in the embossment process or in a separate cutting process. The opening 18 is arc-shaped with a convex side facing toward the tightening structure 14.

In the course of the embossment process, the cuts are opened in the thickness direction of the band by creating opposite deformations on both sides of the cuts, thereby creating the openings 18. On a side of the cut facing the tightening structure 14, the material of the clamping band 12 is domed up to form a cup 20 configured to receive a protrusion (FIG. 5) on the inner clamping band end 12a including the first hook 16. A width of the cup 20 in the transverse direction of the clamping band 12 is larger than the width of the opening 18 and decreases toward the opening 18 so as to create a wedge-shape. The inner walls of the cup 20 stand essentially upright, i.e. perpendicular to a main plane of the clamping band 12. The opening 18 is formed on the front side of the cup 20 and has a height in the thickness direction of the band which corresponds essentially to the thickness of the band material so as to be able to accommodate the first hook 16.

Figure 5:
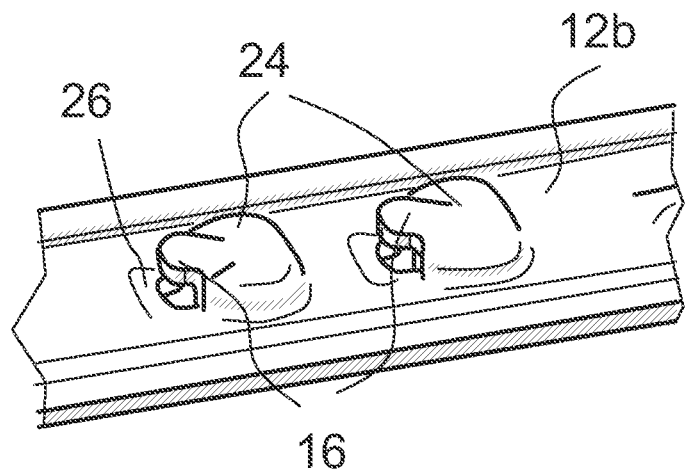
FIG. 5 is a detail view of an inner end of the clamping band with two wedge-shaped protrusions with hooks.
Figure 6:
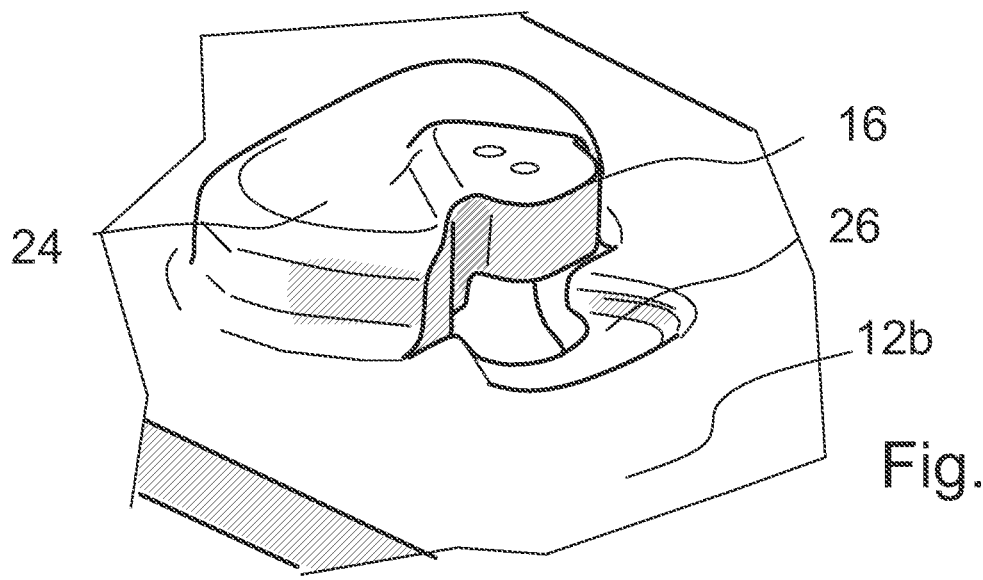
FIG. 6 is a detail view of one of the wedge-shaped protrusions of FIG. 5.
Figure 7:
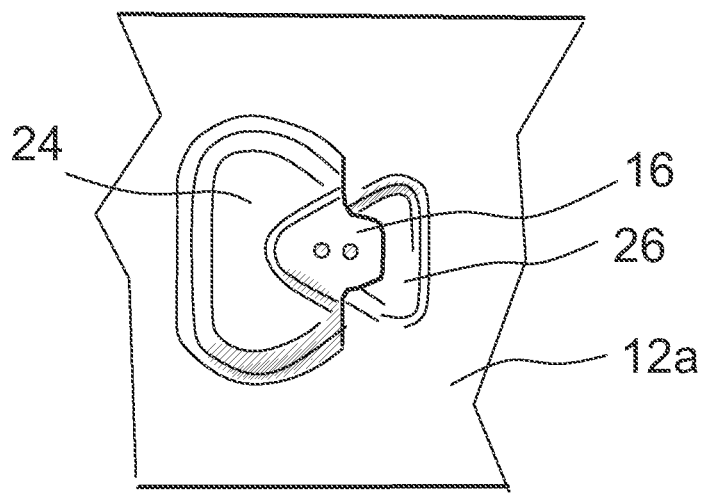
FIG. 7 is a top view of the wedge-shaped protrusion of FIG. 6.

FIGS. 5-7 are detail views of the inner end of the clamping band 12 with two wedge-shaped protrusions 24 with hooks 16. On the inner end of the clamping band 12, a wedge-shaped protrusion 24 is formed which is configured to wedge with inner side faces of the first dome. The first hook 16 is formed on the tip end of the wedge-shaped protrusion 24. A small recess 26 is formed underneath the first hook 16 to accommodate the lower hook 22.

Returning to FIG. 3, note that at a side of the opening 18 facing away from the tightening structure 14, the material of the band is bent downward to form tab acting a lower hook 22 configured to wedge with the upper hook 16.

Both the cup 20 and the wedge-shaped protrusion 24 have a wedge-shaped base with side walls and a top wall, wherein a further structure is embossed in the top wall. A smaller, wedge-shaped dome 20a is provided on the top wall of the cup 20 and is configured to receive the first hook 16. The first hook 16 is formed to protrude beyond the top wall of the wedge-shaped protrusion 24. By virtue of this structure, the wedging effect of the side walls of the bases is disentangled from the upper and lower hooks 16, 22, which press the inner and outer clamping band ends 12a, 12b together.

Figure 8:
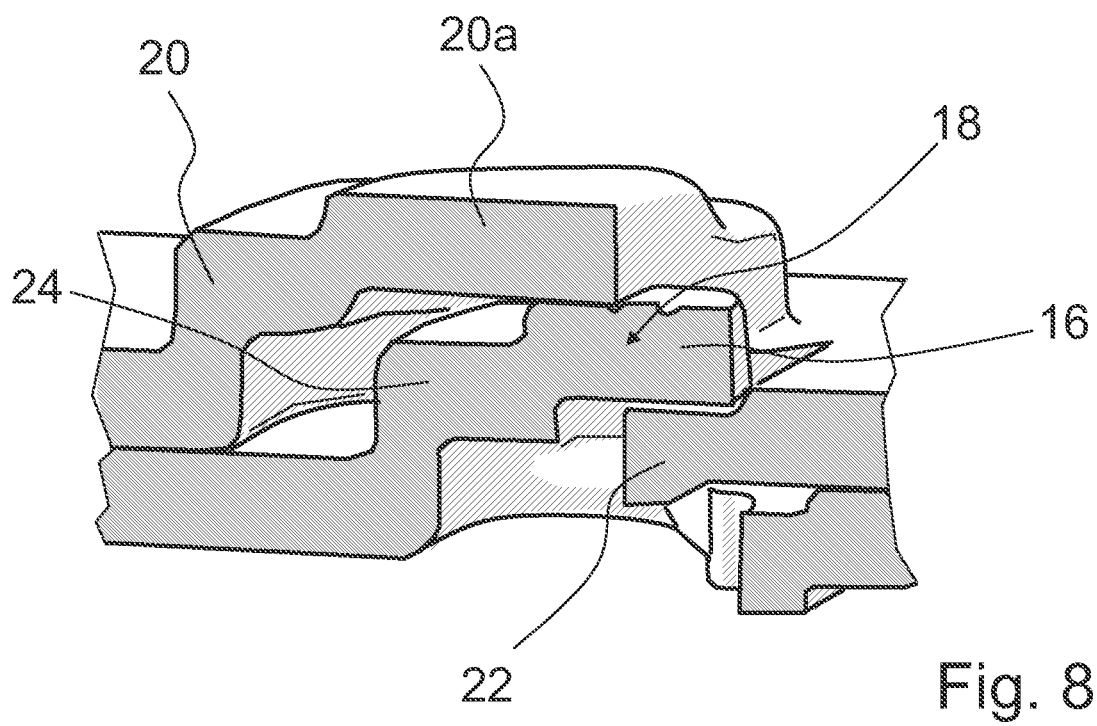
FIG. 8 is a longitudinal section of the closing structure of the ear clamp according to the invention.

FIG. 8 is a longitudinal section of the closing structure of the ear clamp 10 according to the invention. To close the clamp 10, the first hooks 16 are engaged with the corresponding openings 18 to create a pre-assembly state. The clamp 10 is then tightened around the tube by narrowing the ear of the tightening structure 14, i.e. by pressing the legs 14a, 14b of the tightening structure 14 together, for instance using a pliers-type tightening tool, to make a sealed connection between the tube and the object. The tightening force pulls the wedge-shaped protrusions 24 into the wedge-shaped inner walls of the cup 20 such that the tightening force is transmitted not only via the hook 16 and the lower edge of the opening 18 but rather distributed over the walls of the cup 20 and the protrusion 24 and the hook 16 and opening 18. The load on the hook 16 alone is therefore reduced in comparison to the prior art. At the same time, the upper hook 16 wedges with the lower hook 22 to press the wedge-shaped protrusions 24 into the wedge-shaped inner walls of the cup 20. This results in the hook 16 and its surrounding walls being able to transfer more force from the outer clamping band end 12a to the inner clamping band end 12b.

Figure 9:
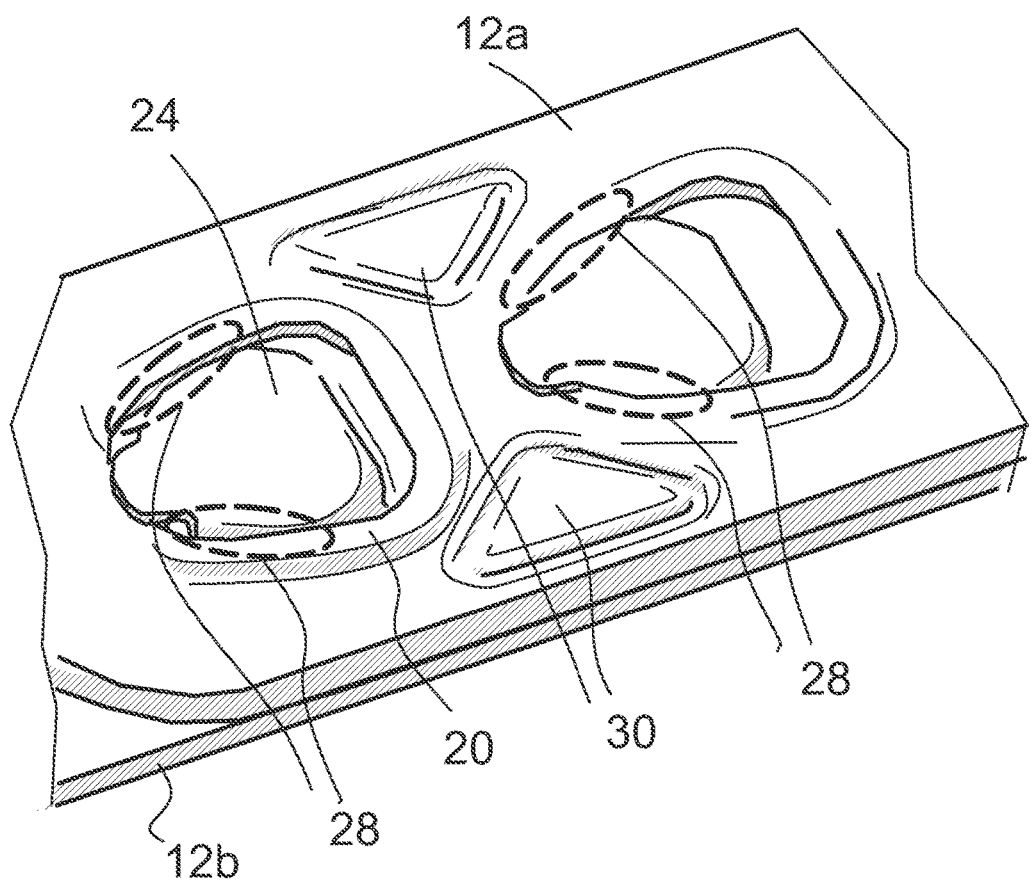
FIG. 9 is a longitudinal section parallel to the plane of the band illustrating force-transfer regions of a closing structure of the ear clamp according to the invention.

FIG. 9 is a longitudinal section illustrating the abutment of the outer walls of the wedge-shaped protrusions 24 with the wedge-shaped inner walls of the cup 20 to transfer force in the force-transfer regions 28 indicated with dashed lines.

The size of the openings 18 which are used to hooking in the hook 16 are minimized to a minimum. No material is punched out of the band to create the openings 18, just cuts are made. The openings 18 were realized in such a way that they only extend in the width direction of the clamping band 12 and that therefore the longitudinal extensions of portions with a reduced cross-section are reduced to a minimum.

The structures including the cup 20 and the wedge-shaped protrusion 24 around the opening 18 and/or the first hook 16 are formed by a material deformation process resulting in cold hardening of the material, in particular embossing.

In addition to the latter structures, reinforcing dimples 30 are formed in proximity to the opening 18. The reinforcing dimples 30 are embossed only on the top side of the clamping band 12, the bottom side of the clamping band 12 being flat at the position of the reinforcing dimples 30.

The hook 16 and opening 18 design according to the invention minimized the band elongation by reducing the size of the hook—in openings 18 and by reinforcing the area with the small hook 16—in openings 18 with the reinforcing dimples 30. This optimization leads to a higher breaking force and enables a higher performance of the clamp. The design ensures that the clamp cannot be opened unintentionally. No additional securing hook or rivet lock is required for this purpose. Due to the improved force transmission the same force can be transmitted with a lower number of hooks 16, which reduced the total length of the clamping band 12 and reduces material consumption. The small size and the avoidance of the securing hook 16 or rivet lock lead to further economies in the required material. However, it is possible that the hooks 16 according to the invention are complemented by an additional securing hook (not illustrated) having a traditional design.

The invention makes different improvements on existing band clamps, namely increasing the force transmission per hook 16, minimizing the band elongation in the area of the hook 16, and reducing the amount of required material.

By virtue of the V-shape the cup 20, the force is not just transferred over the front side of the hook 16, but is rather transferred as well over the two sides of the hook 16, i.e. over the side face of the base of the wedge-shaped protrusion 24.

The inventors have made expansion tests of the hook 16 and found that the breaking force of the new hook 16 design is 12'000N (~+12%) higher compared to the hooks 16 as disclosed in WO 2015022024 A1 or WO 2021104918 A1.

REFERENCE NUMBERS

10 Ear clamp
12 clamping band
12a outer clamping band end
12b inner clamping band end
14 tightening structure
16 hook
18 opening
20 cup
22 lower hook
24 wedge-shaped protrusion
26 recess
28 force-transfer region
30 reinforcing dimples

The invention claimed is:

1. An ear clamp, comprising;
a clamping band (12) and tightening structure (14), wherein the clamping band (12) comprises an outer clamping band end (12a) and an inner clamping band end (12b), wherein the inner clamping band end (12b) includes a first hook (16) which, in the closed condition, passes through an opening (18) in the outer clamping band end (12a), wherein in a top view of the band (12), the opening (18) is slit-shaped, wherein a length of the opening (18) extends in a transverse direction of the clamping band (12), wherein a material of the band is domed up on a side of the opening (18) facing the tightening structure (14) to form a cup (20) having a pair of inner walls configured to receive the first hook (16), and wherein a width of the cup (20) in a transverse direction is larger than a width of the opening (18) and the width of the cup (20) in the transverse direction decreases in a longitudinal direction in a plane of the band toward the opening (18) such that the pair of inner walls of the cup are wedge-shaped.

2. An ear clamp according to claim 1, wherein the length of the opening (18) in the transverse direction of the clamping band (12) is at least five times larger than the width of the opening (18) in the longitudinal direction of the clamping band (12).

3. An ear clamp according to claim 1, wherein the first hook (16) is formed on a tip end of a wedge-shaped protrusion (24) configured to wedge with inner side faces of the cup.

4. An ear clamp according to claim 1, wherein material of the band is bent downward on a side of the opening (18) facing away from the tightening structure (14) to form a lower hook (22) configured to wedge with the first hook (16).

5. An ear clamp according to claim 1, wherein the opening (18) is arc-shaped with a convex side facing toward the tightening structure (14).

6. An ear clamp according to claim 1, wherein the opening (18) formed as a cut without punching material out of the band.

7. An ear clamp according to claim 1, wherein structures around the opening (18) and/or the first hook (16) are formed by a material deformation process resulting in cold hardening of the material.

8. An ear clamp according to claim 1, wherein reinforcing dimples (30) formed in proximity of the opening (18).

9. An ear clamp according to claim 8, wherein the reinforcing dimples (30) are embossed only on a top side of the clamping band (12), a bottom side of the clamping band (12) being flat at a position of the reinforcing dimples (30).

* * * * *